(12) United States Patent  
Konigsberg et al.

(10) Patent No.: US 10,169,810 B2  
(45) Date of Patent: Jan. 1, 2019

(54) PRODUCT INFORMATION INCONSISTENCY DETECTION

(71) Applicant: Twiggle Ltd., Tel-Aviv (IL)

(72) Inventors: Amir Konigsberg, Tel-Aviv (IL); Adi Avidor, Tel-Aviv (IL)

(73) Assignee: Twiggle Ltd., Tel-Aviv (IL)

( * ) Notice: Subject to any disclaimer, the term of this patent is extended or adjusted under 35 U.S.C. 154(b) by 0 days.

(21) Appl. No.: 15/190,563

(22) Filed: Jun. 23, 2016

(65) Prior Publication Data

US 2017/0372407 A1    Dec. 28, 2017

(51) Int. Cl.
```
G06Q 30/00    (2012.01)
G06Q 30/06    (2012.01)
G06F 17/27    (2006.01)
G06F 17/28    (2006.01)
```

(52) U.S. Cl.
CPC ..... G06Q 30/0641 (2013.01); G06F 17/2775 (2013.01); G06F 17/28 (2013.01)

(58) Field of Classification Search
CPC .............. G06Q 30/0601; G06Q 30/0641
USPC ................................. 705/26.1, 27.1
See application file for complete search history.

(56) References Cited

U.S. PATENT DOCUMENTS

| | | | |
|---|---|---|---|
| 2008/0059335 A1* | 3/2008 | Tenorio ................. | G06Q 30/02 705/26.62 |
| 2013/0226945 A1* | 8/2013 | Swinson ........... | G06F 17/30985 707/758 |
| 2015/0052143 A1* | 2/2015 | Liu ................... | G06F 17/30705 707/740 |

OTHER PUBLICATIONS

Kukich, Karen, Techniques for Automatically Correcting Words in Text, Dec. 1992, ACM Computing Surveys, vol. 24, No. 4 (Year: 1992).*

* cited by examiner

*Primary Examiner* — Brandy A Zukanovich  
*Assistant Examiner* — Brittney N Miller

(57) ABSTRACT

A computerized method of detecting product description inconsistencies, comprising receiving from a seller a product description comprising one or more attributes of a product offered for sale on an online marketplace arena, extracting automatically the one or more attributes by analyzing the product description using one or more language analysis tool, analyzing automatically the one or more attributes compared to a plurality of attributes of one or more other products of a same class as the product to detect one or more inconsistencies of the product description with respect to the one or more attributes and outputting the at least one inconsistency.

18 Claims, 2 Drawing Sheets

PRODUCT INFORMATION INCONSISTENCY DETECTION

BACKGROUND

The present invention, in some embodiments thereof, relates to detecting product description inconsistencies, and, more specifically, but not exclusively, to detecting product description inconsistencies by analyzing the product description compared to a plurality of other product descriptions available on an online marketplace arena.

Online trade using online marketplace arenas has become a major platform for trading, selling and buying goods. A growing number of traders, sellers and buyers are involved in online trading with vast volumes of money changing hands.

Accurate description of the goods offered for sale on the online marketplace arenas is essential to make sure a fair trade is conducted. Both the buyers and the sellers need to be protected from incorrect information posted for the products offered on the online marketplace arenas. Furthermore, the reputation of the online marketplace arenas must be maintained by reducing the incidents of erroneous and/or misleading product description that may result in unsatisfied customers and/or traders.

SUMMARY

According to some embodiment of the present invention there is provided a computerized method of detecting product description inconsistencies, comprising:

Receiving from a seller a product description comprising one or more attributes of a product offered for sale on an online marketplace arena.

Extracting automatically the one or more attributes by analyzing the product description using one or more language analysis tools.

Analyzing automatically the one or more attributes compared to a plurality of attributes of one or more other products of a same class as the product to detect one or more inconsistencies of the product description with respect to the one or more attributes.

Outputting the one or more inconsistencies.

The product description includes a product title, product specification and/or product documentation.

The one or more language analysis tools are a natural language analyzer (NLA) capable of natural language processing (NLP).

Optionally, the product is classified to a pre-defined products model of products based on the one or more attributes.

Optionally, a multi-dimensional attributes distribution is created that comprises values of two or more attributes of the product.

The one or more other products are available for sale on the online marketplace arena.

Optionally, the analysis includes analyzing the one or more attributes with respect to information retrieved from one or more online data sources external to the online marketplace arena.

The outputting includes providing the one or more inconsistencies to the seller and/or the online marketplace arena.

The method of claim 1, further comprising correcting the at least one inconsistency prior to posting the product description on the online marketplace arena.

Optionally, upload of the product description to the online marketplace arena is prevented in case the one or more inconsistencies are detected.

Optionally, an indication is generated to the seller in case the one or more inconsistencies are detected to inform the seller of the one or more inconsistencies.

Optionally, an indication is generated to the online marketplace arena in case the one or more inconsistencies are detected.

Optionally, a corrective action is offered to the seller to fix the one or more attributes in case the one or more inconsistencies are detected.

According to some embodiment of the present invention there is provided a system for detecting product description inconsistencies, comprising a program store for storing a code and one or more processors coupled to the program store. The one or more processors are adapted to execute the code that comprises:

Code instructions to receive from a seller a product description comprising one or more attributes of a product offered for sale on an online marketplace arena.

Code instructions to extract automatically the one or more attributes by analyzing the product description using one or more language analysis tools.

Code instructions to analyze automatically the one or more attribute compared to a plurality of attributes of one or more other products of the same class as the product to detect one or more inconsistencies of the product description with respect to the one or more attributes.

Code instructions to output the one or more inconsistencies.

The product description includes a product title, product specification and/or product documentation.

The one or more language analysis tools are an NLA capable of NLP.

Optionally, the one or more processors are adapted to classify the product to a pre-defined products model of products based on the one or more attributes.

Optionally, the one or more processors are adapted to create a multi-dimensional attributes distribution comprising values of two or more attributes of the product.

Optionally, the analysis includes analyzing the one or more attributes with respect to information retrieved from one or more online data sources external to the online marketplace arena.

Optionally, the one or more processors are adapted to take one or more actions in case of detection of the one or more inconsistencies. The one or more actions may include:

Present the one or more inconsistencies to the seller and/or the online marketplace arena.

Correct the one or more inconsistencies prior to posting the product description on the online marketplace arena.

Prevent upload of the product description to the online marketplace arena.

Generate an indication to the seller and/or the online marketplace arena to inform the seller of the at least one inconsistency.

Offer the seller a corrective action to fix the at least one attribute.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
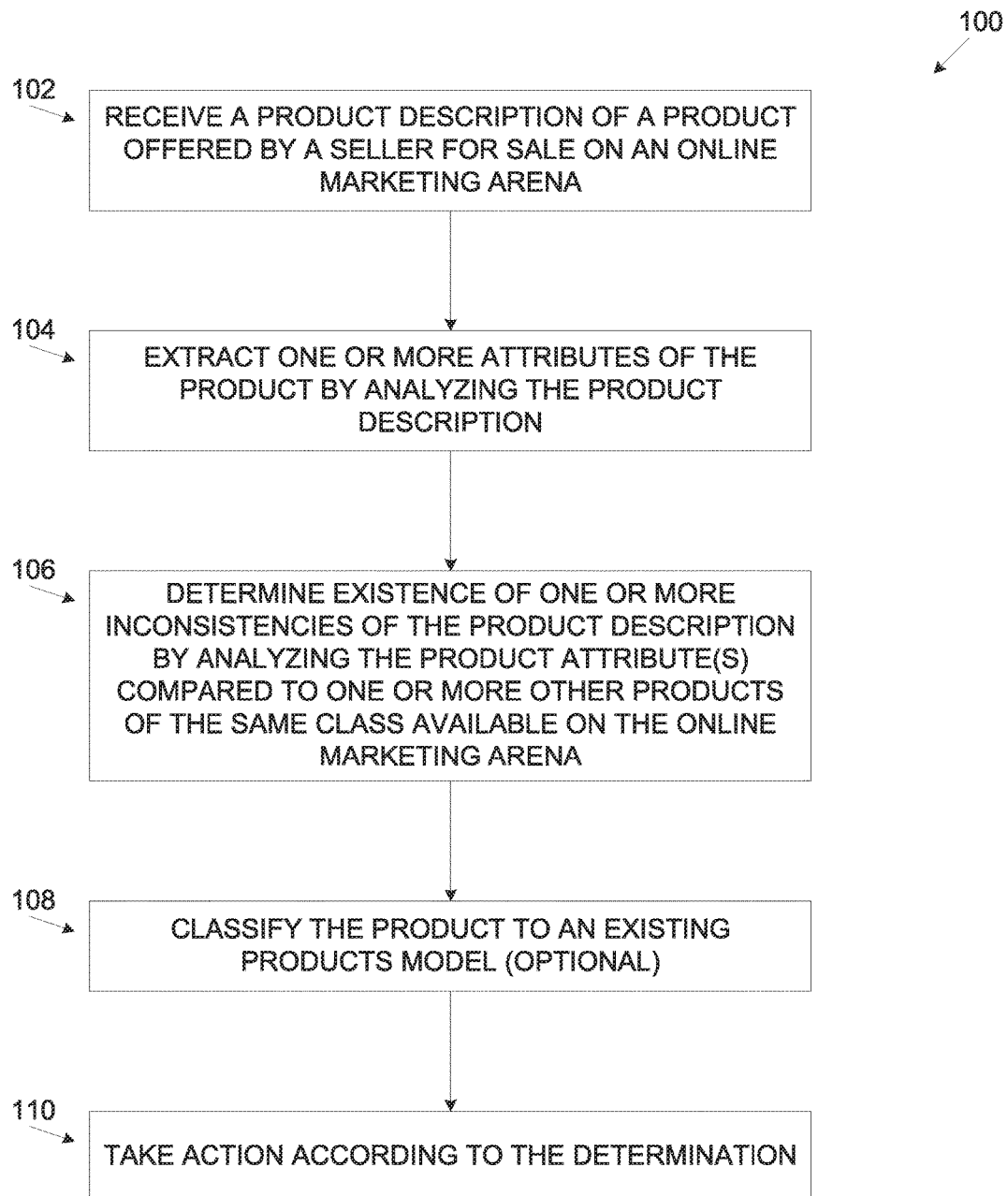
FIG. 1 is a flowchart of an exemplary process 100 for detecting inconsistencies in a product description of a product offered for sale on an online marketing arena, according to some embodiments of the present invention.

The present invention, in some embodiments thereof, relates to detecting product description inconsistencies, and, more specifically, but not exclusively, to detecting product description inconsistencies by analyzing the product description compared to a plurality of other product descriptions available on an online marketplace arena.

According to some embodiments of the present invention, there are provided methods and systems for detecting product description inconsistencies by analyzing one or more attributes extracted from a product description provided by a seller posting a product for sale on an online marketplace arena compared to attributes of one or more other products available on an online marketplace arena. One or more automated natural language analyzer (NLA) methods, techniques and/or tools capable of natural language processing (NLP) are applied to analyze the product description in order to identify and extract the attribute(s) inserted by the seller to describe the product offered for sale.

A comparison analysis is initiated automatically to compare the extracted attribute(s) with attributes of one or more other products of the same type, class and/or product domain available on the online marketplace arena to determine consistency of the attributes indicated by the seller with the actual characteristics of the product. Optionally, the comparison analysis may include comparing the extracted attribute(s) to data available from external data sources, for example, documentation available from a manufacturer of the product, a website of the manufacturer and/or the like. The comparison analysis may further include comparing between extracted attribute(s) that are extracted from different documents provided by the seller itself, for example, a product title and a product specification. The detected inconsistency(s) may relate quantitative and/or qualitative information/data conflicts of one or more characteristics of the product, for example, a product feature, a product attribute, a product usage characteristic and/or a target market characteristic.

The inconsistency may be expressed through for example, numerical values, measures, currencies and/or the like as well as through textual descriptions and/or visual information. Based on the comparison analysis, one or more actions may be taken to resolve the detected inconsistency(s), for example, correcting the inconsistency(s), alerting the seller and/or the online marketplace arena system of the inconsistency(s) and/or preventing uploading the product for sale on the online marketplace arena. Optionally, one or more corrective actions may be offered to the seller to resolve the detected inconsistency(s).

The product inconsistency detection may present significant advantages to online trading platforms. The product inconsistency detection may prevent posting erroneous product description that may mislead potential buyers shopping on the online marketing arena. The erroneous product description may be intentionally indicated by the seller and/or provided by the seller by mistake.

The product inconsistency detection may further protect the seller from advertising the product wrongly in a way that may present issues later on during one or more purchases. For example, the seller may indicate by mistake one or more characteristics of the product that may later turn cause the seller a loss, for example, a lower price than is appropriate for the offered product, an longer warranty period than is actually provided for the product and/or the like. Furthermore, reducing and/or avoiding erroneous and/or misleading product description may benefit the reputation of the marketplace arena by ensuring a positive trading and/or buying experience for the sellers and/or the buyers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is flowchart of an exemplary process 100 for detecting inconsistencies in a product description of a product offered for sale on an online marketing arena, according to some embodiments of the present invention. The process 100 is executed to detect one or more inconsistencies (discrepancies) of a product description associated with a product a seller offers for sale on an online marketing arena. The process 100 analyzes the product description provided by the seller to extract one or more attributes of the product and compares the product attribute(s) to attributes of one or more other products of the same class, type and/or model that are available for sale on the online marketing arena in order to identify the inconsistency(s).

The process 100 employs one or NLA methods, techniques and/or tools to analyze the product description and extract the product attribute(s). The process 100 then compares the extracted attribute(s) to attribute(s) of similar product to identify the inconsistency(s). The process 100 may also use product information collected from one or more external data sources to identify the inconsistency(s). In addition, the process 100 may identify the inconsistency(s) by comparing the product attribute(s) extracted from different documents provided by the seller itself. The process 100 may further apply one or more modeling techniques to create classify the product in a products model created for the online marketplace arena.

Figure 2:
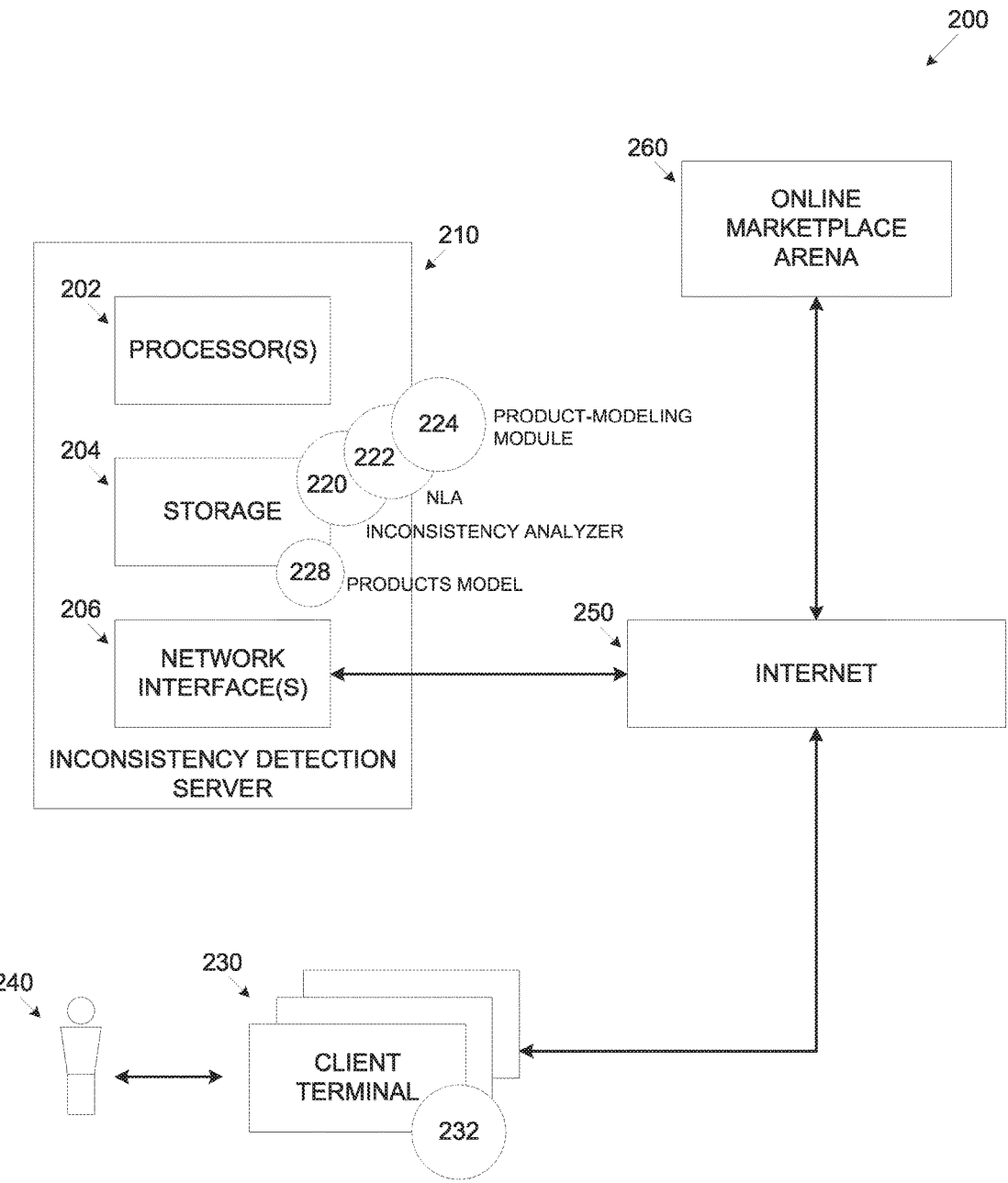
FIG. 2 is a schematic illustration of an exemplary system for detecting inconsistencies in a product description of a product offered for sale on an online marketing arena, according to some embodiments of the present invention.

Reference is also made to FIG. 2, which is a schematic illustration of an exemplary system 200 for detecting inconsistencies in a product description of a product offered for sale on an online marketing arena, according to some embodiments of the present invention. The system 200 includes an inconsistencies detection server 210 that communicates over the internet 250 with one or more client terminals 230 such as, for example, a computer, a laptop, a Smartphone, a tablet, a server and/or the like. The campaign manager server 202 is capable of communicating with one or more online marketing arena 260 such as, for example, Amazon(dot)com®, Ali Express®, Alibaba(dot)com® and/or the like.

One or more sellers 240 using one or more of the client terminals 230 may communicate over the internet 250 with the online marketing arena(s) 260 in order to offer one or more products for sale on the online marketing arena 260. In order to offer the product(s) for sale, the seller 240 needs to provide a product description, for example, a product title, a product description, a product type, a product class, a product specification, a product documentation and/or the like to describe the product offered for sale. The inconsistencies detection server 210 may analyze the provided product description prior to posting the product for sale on the online marketing arena 260 in order to verify the product description is accurate having no inconsistencies that may mislead potential buyers shopping on the online marketing arena 260.

The inconsistencies detection server 210 includes a processor(s) 202 for executing a process such as the process 100, a storage 204 and one or more network interfaces 206 for connecting to the internet 250 via one or more networks to communicate with the client terminal(s) 230 and/or the online marketing arena 260.

The processor(s) 202, homogenous or heterogeneous, may be arranged for parallel processing, as clusters and/or as one or more multi core processor(s). The storage 204 may include one or more non-transitory, non-volatile devices, for example, a hard drive, a Flash array and the like. The storage 204 may perform as a program store for storing one or more software modules such, for example, an inconsistency analyzer 220, an NLA 222 and/or a product-modeling module 224.

Wherein a software module refers to a plurality of program instructions stored in a non-transitory medium such as the storage 204 and executed by a processor such as the processor(s) 202. The storage 204 may further comprise one or more network storage devices, for example, a storage server, a network accessible storage (NAS) a network drive, and/or the like.

The network interface(s) 206 may include a local area network (LAN) interface, a wide area network (WAN) interface, a cellular network interface and/or the like. The campaign manager server 202 may be implemented through one or more networked processing nodes, for example, a server, a processing cluster comprising a plurality of processing nodes and/or the like. The processor(s) 202 may further employ a distributed processing architecture comprising a plurality of distributed processing nodes communicating with each other.

Optionally, the inconsistencies detection server 210 is implemented as a cloud service for example, a software as a service (SaaS), a platform as a service (PaaS) and/or the like. The cloud service may provide one or more virtual processing and/or storage platforms for implementing the inconsistencies detection server 210.

Optionally, the inconsistencies detection server 210 is integrated within the online marketplace arena 260.

The inconsistencies detection server 210 may be configured to receive the product description provided by the seller 240 and analyze the product description before posting it on the online marketplace arena 260. Additionally and/or alternatively, the product description provided by the seller 240 is received by the online marketplace arena 260 that transfers it to the inconsistencies detection server 210 for analysis.

The process 100 may be implemented through one or more software modules such as the inconsistency analyzer 220, the NLA 222 and/or the product-modeling module 224 executed by the processor(s) 202.

Optionally, the product-modeling module 224 creates a product model 228 for classifying one or more and preferable all products offered for sale on the online marketplace arena. The products model 228 may be stored on the inconsistency detection server 210 and/or by the online marketplace arena 260. The products model 228 is constructed to organize and/or classify the plurality of products available on the online marketplace arena 260. The product-modeling module 224 may create and maintain the products model 228 based on one or more aspects, concepts and/or characteristics of the products, for example, a type, a class, a category, a use, a price range, a target market segment, a geographical location, a calendric event and/or the like.

The products model 228 is created by collecting product data from an online product catalogue of the online marketplace arena 260 and structuring the product data into an umbrella of concepts of the products, for example, classes, kinds, types, attributes, attribute values, accessories, compatibilities and/or the like. The products model 228 may be further constructed and/or adapted to reflect the relations between two or more of the concepts. Thereafter the product-modeling module 224 locates (inserts) each product available in the online product catalogue into the products model 228 such that each product is classified according to the structure of the products model 228, e.g., by appropriate scoring per each of the concepts.

The products model 228 is dynamic and may be adjusted by the product-modeling module 224 to adapt to the online product catalogue that may be different between different online marketplace arenas 260. The product-modeling module 224 may use natural language analysis mechanisms and/or prior information/data relating to, for example, online names, labels, product descriptions, attributes, value and/or the like that are typical of the products and may be found on the internet 250 at large. This is done in order to properly map the taxonomy of the products model 228 to the taxonomy of the online product catalogue of the respective online marketplace arena 260.

Each of the client terminals 230 also includes a processor such as the processor(s) 202, storage such as the storage 204 and one or more network interfaces such as the network interface(s) 206. The client terminal(s) 230 further include a user interface 208 for interacting and receiving instructions from one or more users (sellers) 240. The user interface 208 may include one or more human interface devices, for example, a keyboard, a mouse, a touchpad, a display, a touchscreen and the like for interacting with the seller 240 through, for example, a graphic user interface (GUI) provided by an operating system (OS) executed on the client terminal 230. The client terminal(s) 230 may execute one or more software modules, such as for example, a product sale manager 232 executed by the processor(s) 202 of the client terminal(s) 230 from the storage 204 of the client terminal(s) 230.

The product sale manager 232 allows the seller(s) 240 to interact with the online marketplace arena 260 in order to post one or more products for sale on the online marketplace arena 260. The product sale manager 232 may be, for example, a web browser that allows the seller 240 to access the online marketplace arena 260 and/or the inconsistencies detection server 210. Additionally and/or alternatively, the product sale manager 232 may be an application executed by the client terminals 230 to allow the seller(s) 240 to interact over the internet 250 with the online marketplace arena 260 and/or the inconsistencies detection server 210.

As shown at 102, the process 100 starts with the inconsistency analyzer 220 receiving the product description from the seller 240 using the product sale manager 232. The product description may include, for example, a product title, a product description, a product type, a product class, a product specification, a value related to the product, an attribute, a feature or characteristic of the product, a product documentation and/or the like to describe the product offered for sale on the online marketplace arena 260. The inconsistency analyzer 220 may communicate directly with the seller using the product sale manager 232 to receive the product description. Optionally, the inconsistency analyzer 220 receives the product description from the online marketplace arena 260 to which the seller 240 provides the product description.

As shown at 104, the NLA 222 applies one or more NLA methods, algorithms and/or tools to analyze the product description that may be provided as a natural language, for example, a text, an audible playback, a visual capture and/or the like.

The NLA 222 may apply linguistic analysis in order to comprehend the product description that may be provided in one or more of a plurality of languages. The NLA 222 may use NLA methods, algorithms and/or tools as known in the art. Optionally, the NLA 222 may use NLA methods, algorithms and/or tools specifically adapted for analyzing product description information for products offered for sale on the online marketplace arena(s) 260. The NLA 222 analyzes the product description to extract one or more attributes describing the product offered for sale. The product attributes may relate to one or more of, a product characteristic, a product use, a target market and/or the like.

The product attributes may include, for example, a type, a class, a manufacturer, a distributer, a feature, a capability, a price, a delivery method, a payment terms, a liability term and/or the like. For example, the attributes extracted from a product description for a laptop may include a model, a manufacturer, processor architecture, processor speed, a display size, a random access memory (RAM) capacity, a storage capacity, a battery capacity, a price and/or the like.

As shown at 106, the inconsistency analyzer 220 analyzes the extracted attribute(s) compared to attributes of other product of the same type, class and/or product domain. The attributes of the other products may be extracted from other products available for sale on the online marketplace arena 260 and/or other products that were available for sale on the online marketplace arena 260 in the past. The inconsistency analyzer 220 may use an application programming interface (API) of the online marketplace arena 260 to access the database and/or the website of the online marketplace arena 260. The inconsistency analyzer 220 may further access one or more other online information resources for retrieving information (attributes) of the product, for example, a manufacturer website, a distributer website, a documentation repository and/or the like. The inconsistency analyzer 220 may use the API of the other online information resources to retrieve the required information.

The inconsistency analyzer 220 may also analyze two or more attributes extracted from the product description that may conflict each other. For example, for a laptop the product title provided by the seller 240 may indicate a 15.6" display size while the product specification provided by the seller 240 indicates a 14.1" display size.

The inconsistency analyzer 220 may then determine whether the product's attribute(s) extracted from the product description provided by the seller 240 are consistent or inconsistent with the attributes of the other products of the same class, category, type and/or domain. The inconsistency of the attributes may include one or more inconsistency types, for example, a missing attribute, an ambiguous attribute and/or an incorrect attribute.

The missing attribute(s) detected by the inconsistency analyzer 220 may relate to an attribute that is required to identify properly the product to potential buyers browsing the online marketplace arena 260. For example, the seller 240 may post a product description comprising, for example, a manufacturer, a processor type, a display size and a RAM capacity but failing to indicate the model and/or type of the product, for example, a Smartphone, a tablet, a laptop and/or a desktop. The inconsistency analyzer 220 may detect the missing attribute by analyzing the product description compared to the other products of the same class, category, type and/or domain. For example, based on the manufacturer information attribute and the display size the inconsistency analyzer 220 may determine that the product description relates to a tablet.

The ambiguous attribute(s) detected by the inconsistency analyzer 220 may relate to an attribute that is not definite and/or may relate to different characteristics of the product and may potentially mislead buyers browsing the online marketplace arena 260. For example, the seller 240 may post a product description comprising, for example, a manufacturer, a model, a display size, and a capacity size of, for instance, 16 GB but failing to indicate to which memory resource the capacity size relates.

The inconsistency analyzer 220 may detect the ambiguous attribute by analyzing the product description compared to the other products of the same class, category, type and/or domain. For example, based on the manufacturer information attribute and the model attribute, the inconsistency analyzer 220 may determine that the product is a laptop and the 16 GB capacity size relates to a solid-state disk (SSD) of the laptop.

The incorrect attribute(s) detected by the inconsistency analyzer 220 may relate to an attribute that is not correct with respect to the product and may potentially mislead buyers browsing the online marketplace arena 260. For example, the seller 240 may post a product description comprising, for example, a product class for instance a laptop, a target market segment, for instance, elderly and/or children, a manufacturer, a model and a keyboard keys size indicating large keys.

The inconsistency analyzer 220 may detect the incorrect attribute by analyzing the product description compared to the other products of the same class, category, type and/or domain. For example, based on the model the inconsistency analyzer 220 may determine that the laptop has a keyboard with standard size keys and is therefore not suitable for elderly and/or children as indicated by the seller 240 in the product description. As another example, the seller 240 may post a product description comprising, for example, a product class indicating for example, a tablet, a manufacturer, a model and a price. The inconsistency analyzer 220 may detect that the price set by the seller 240 is, for instance, 5 times higher than the average price of similar product models from the same manufacturer.

Optionally, the inconsistency analyzer 220 creates a multi-dimensional attribute distribution record. The attribute distribution record may include two or more attributes extracted from the product description received from the seller 240.

The inconsistency analyzer 220 may use the attribute distribution record to compare more accurately the extracted attributes to the attributes of the other products and thus detect more accurately the inconstancy(s). For example, the inconsistency analyzer 220 may create an attribute distribution record for a laptop offered for sale comprising, for example, a price attribute and a RAM capacity attribute. While comparing the extracted attributes to the attributes of the other products, the inconsistency analyzer 220 select for comparison one or more products of the other products that have the same characteristics as specified in the attributes distribution record of the offered laptop, i.e. having a similar RAM capacity and a similar price range.

The focused comparison to the similar other products may both allow the inconsistency analyzer 220 to detect more accurately attribute inconsistencies as well as avoiding false attribute inconsistency detection. For example, a specific laptop offered by the seller 240 may have several RAM capacity configurations that may significantly affect the price of the laptop. Using the attributes distribution record created for the laptop, the inconsistency analyzer 220 may compare the attributes of the laptop to attributes of other laptops having the same RAM capacity to determine inconsistency of the price range of the laptop compared to the other products.

As shown at 108, which is an optional step, the product-modeling module 224 classifies the product to a products model such as the products model 228. The classification is done based on the attribute(s) of the product extracted from the product description. The product-modeling module 224 may maintain the products model 228 for one or more and preferably for all the products offered for sale on the online marketplace arena 260.

The product-modeling module 224 may create and maintain the products model 228 based on one or more aspects and/or concepts of the products offered for sale on the online marketplace arena 260, for example, a product category, a product price range, a target market segment, a product use, a geographical location and/or the like. The products model 228 may be used by the inconsistency analyzer 220 to identify more accurately the attribute(s) of the product offered by the seller 240 and thus more easily and/or accurately detect inconsistencies of the extracted product attributes with respect to other products of the same class, category, type and/or domain.

As shown at 110, the inconsistency analyzer 220 may take one or more actions based on the analysis and determination. The inconsistency analyzer 220 may output and/or indicate the detected inconsistency(s) to the seller 240 and/or to the system of the online marketplace arena 260. The inconsistency analyzer 220 may provide the detected inconsistency(s) in one or more representations, for example, a numerical value, a measure, a metrics, a currency and/or the like. The inconsistency analyzer 220 may also provide the detected inconsistency(s) in the form of a textual description and/or as visual information.

In case the inconsistency analyzer 220 detects an inconsistency of the attribute(s) in the product description, the inconsistency analyzer 220 may prevent the seller 240 from uploading the product description to the online marketplace arena 260. Additionally and/or alternatively the inconsistency analyzer 220 may provide an indication, for example, send an alert and/or a message to the seller 240 indicating of the detected attribute(s) inconsistency(s). The inconsistency analyzer 220 may also transmit an indication, an alert and/or a message to the online marketplace arena 260 indicating of the detected attribute(s) inconsistency(s).

Optionally, the inconsistency analyzer 220 offers one or more corrective actions to the seller 240 for resolving the detected inconsistencies. For example, in case the seller 240 failed to provide one or more missing, ambiguous and/or incorrect attributes, the inconsistency analyzer 220 may present the seller 240 with one or more optional values to fill in and/or replace the missing attribute(s) values.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of preventing upload of erroneous product descriptions in online marketplace arenas, comprising:
    performing operations on a server side of an online marketplace arena, the operations comprising:
        receiving, from a client terminal of a seller and over a network, a request to upload a product description of a product offered for sale on said online marketplace arena;
        obtaining a product class of said product;
        using at least one processor for:
            automatically extracting a plurality of product attributes, other than a product class attribute, of said product, by analyzing said product description using at least one language analysis tool;
            accessing a storage of the online marketplace arena;
            identifying, in said storage, a plurality of stored products available for sale on the online marketplace arena and belonging to said product class;
            identifying in said product description a missing attribute or an incorrect attribute among said plurality of product attributes of said product by performing a comparison between said plurality of product attributes of said product and a plurality of stored product attributes common to said plurality of stored products, wherein said missing attribute or said incorrect attribute is an attribute other than said product class attribute, wherein said missing attribute is found in said plurality of stored product attributes and missing from said plurality of product attributes of said product, wherein said incorrect attribute is one of said plurality of product attributes of said product which has a value inconsistent with values of a respective attribute from said plurality of stored product attributes;
            in response to identifying in said product description at least one of said missing attribute and said incorrect attribute among said plurality of product attributes of said product:
                preventing said upload of said product description to said online marketplace arena,
                generating an indication for presentation to the seller of said product, wherein the indication informs said seller of said at least one of said missing attribute and said incorrect attribute, and
                transmitting the indication to the client terminal of the seller; and
            in response to not identifying in said product description at least one of said missing attribute and said incorrect attribute among said plurality of product attributes of said product, automatically uploading said product description to said online marketplace.

2. The method of claim 1, wherein said product description includes at least one member of a group consisting of: a product title, a product specification, and a product documentation.

3. The method of claim 1, wherein said at least one language analysis tool is a natural language analyzer (NLA) capable of natural language processing (NLP).

4. The method of claim 1, wherein the operations further comprise classifying said product to a pre-defined products model of products based on said plurality of product attributes of said product.

5. The method of claim 1, wherein the operations further comprise creating a multi-dimensional attributes distribution comprising values of at least two attributes of said product.

6. The method of claim 1, wherein said analyzing said product description is further performed by using information retrieved from at least one online data source external to said online marketplace arena.

7. The method of claim 1, wherein said indication is further presented to said online marketplace arena.

8. The method of claim 1, wherein the operations further comprise correcting said at least one of said missing attribute and said incorrect attribute prior to uploading said product description on said online marketplace arena.

9. The method of claim 1, wherein the operations further comprise:
    generating a second indication to the online marketplace arena in response to identifying in said product description the at least one of said missing attribute and said incorrect attribute among said plurality of product attributes of said product; and
    informing said online marketplace arena, using said second indication, of said at least one of said missing attribute and said incorrect attribute.

10. The method of claim 1, wherein the operations further comprise offering the seller of said product a corrective action to fix said plurality of product attributes in response to identifying in said product description the at least one of said missing attribute and said incorrect attribute among said plurality of product attributes of said product.

11. The method of claim 1, wherein the operations further comprise identifying an inconsistency between at least two attributes of said product in said product description; wherein said preventing upload of said product description is further performed in response to said inconsistency in said product description being identified.

12. A system for preventing upload of erroneous product descriptions in online marketplace arenas, comprising:

at least one server comprising:
  a program store for storing code;
  at least one processor coupled to said program store, said at least one processor is adapted to execute said code, said code comprising computer executable instructions to:
    receive, from a client terminal of a seller and over a network, a request to upload a product description of a product offered for sale on an online marketplace arena;
    obtain a product class of said product;
    automatically extract a plurality of product attributes, other than a product class attribute, of said product, by analyzing said product description using at least one language analysis tool;
    access a storage of the online marketplace arena;
    identify, in said storage, a plurality of stored products available for sale on the online marketplace arena and belonging to said product class;
    identify in said product description a missing attribute or an incorrect attribute among said plurality of product attributes of said product by performing a comparison between said plurality of product attributes of said product and a plurality of stored product attributes of said plurality of stored products common to said plurality of stored products, wherein said missing attribute or said incorrect attribute is an attribute other than said product class attribute, wherein said missing attribute is found in said plurality of stored product attributes and missing from said plurality of product attributes of said product, wherein said incorrect attribute is one of said plurality of product attributes of said product which has a value inconsistent with values of a respective attribute from said plurality of stored product attributes;
    in response to identifying in said product description at least one of said missing attribute and said incorrect attribute among said plurality of product attributes of said product:
      prevent said upload of said product description to said online marketplace arena,
      generate an indication for presentation to the seller of said product, wherein the indication informs said seller of said at least one of said missing attribute and said incorrect attribute, and
      transmit the indication to the client terminal of the seller; and
    in response to not identifying in said product description at least one of said missing attribute and said incorrect attribute among said plurality of product attributes of said product, automatically upload said product description to said online marketplace.

13. The system of claim 12, wherein said product description includes at least one member of a group consisting of: a product title, a product specification, and a product documentation.

14. The system of claim 12, wherein said at least one language analysis tool is a NLA capable of NLP.

15. The system of claim 12, wherein said code further comprises executable instructions to classify said product to a pre-defined products model of products based on said plurality of product attributes of said product.

16. The system of claim 12, wherein said code further comprises executable instructions to create a multi-dimensional attributes distribution comprising values of at least two attributes of said product.

17. The system of claim 12, wherein said plurality of stored product attributes are extracted from information retrieved from at least one online data source external to said online marketplace arena.

18. The system of claim 12, wherein said code further comprises executable instructions to, in response to identifying in said product description the at least one of said missing attribute and said incorrect attribute among said plurality of product attributes of said product, perform at least one of:
  presenting said at least one of said missing attribute and said incorrect attribute to said online marketplace arena;
  correcting said at least one of said missing attribute and said incorrect attribute prior to uploading said product description on said online marketplace arena;
  generating second indication to the online marketplace arena and informing said online marketplace arena, using said second indication, of said at least one of said missing attribute and said incorrect attribute; and
  offering said seller a corrective action to fix said plurality of product attributes.

* * * * *